Feb. 12, 1935.  R. G. SMITH  1,990,570
TOOL FOR REMOVING BEARINGS
Filed Dec. 22, 1932  3 Sheets-Sheet 1
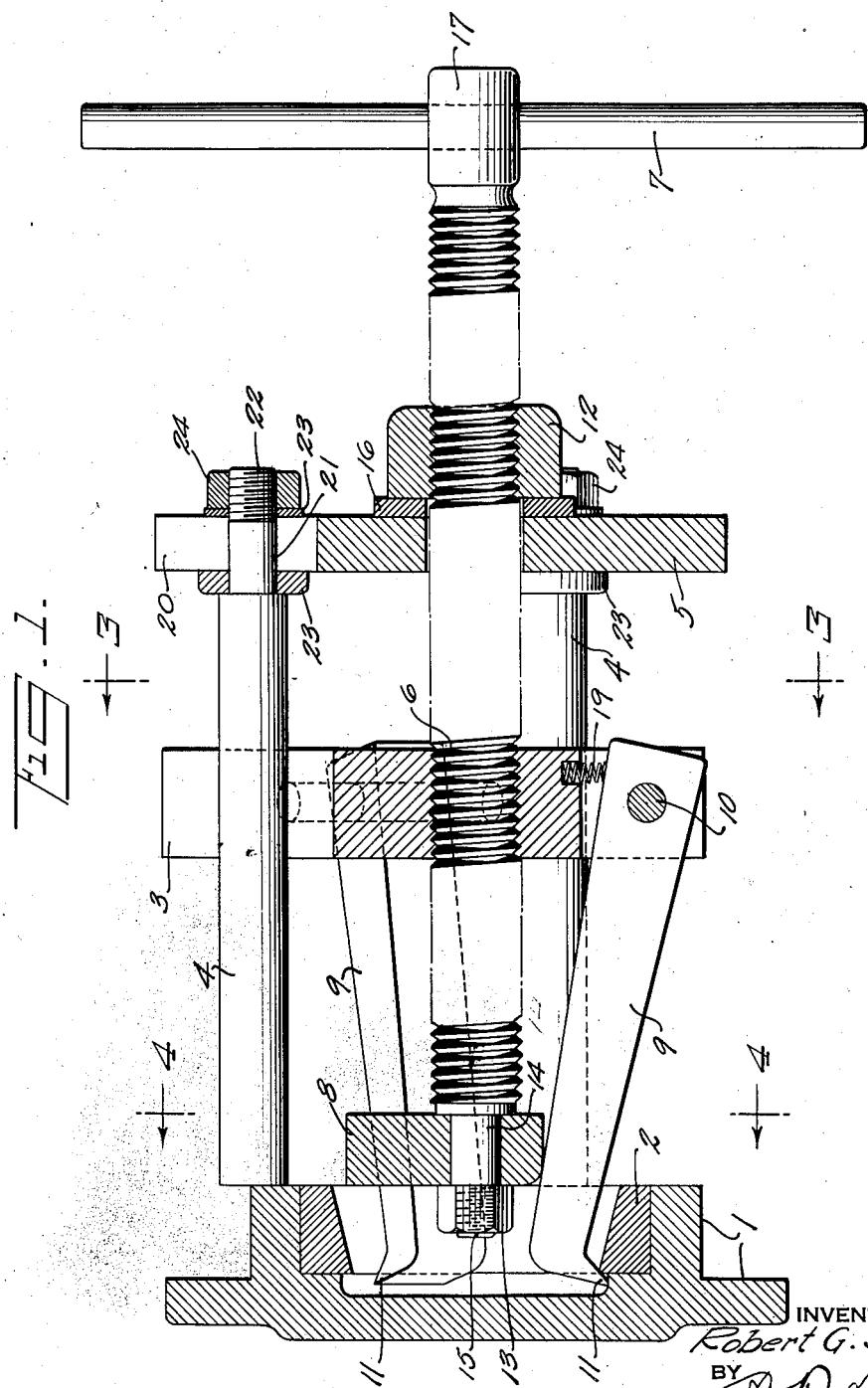
INVENTOR
Robert G. Smith
BY
ATTORNEY

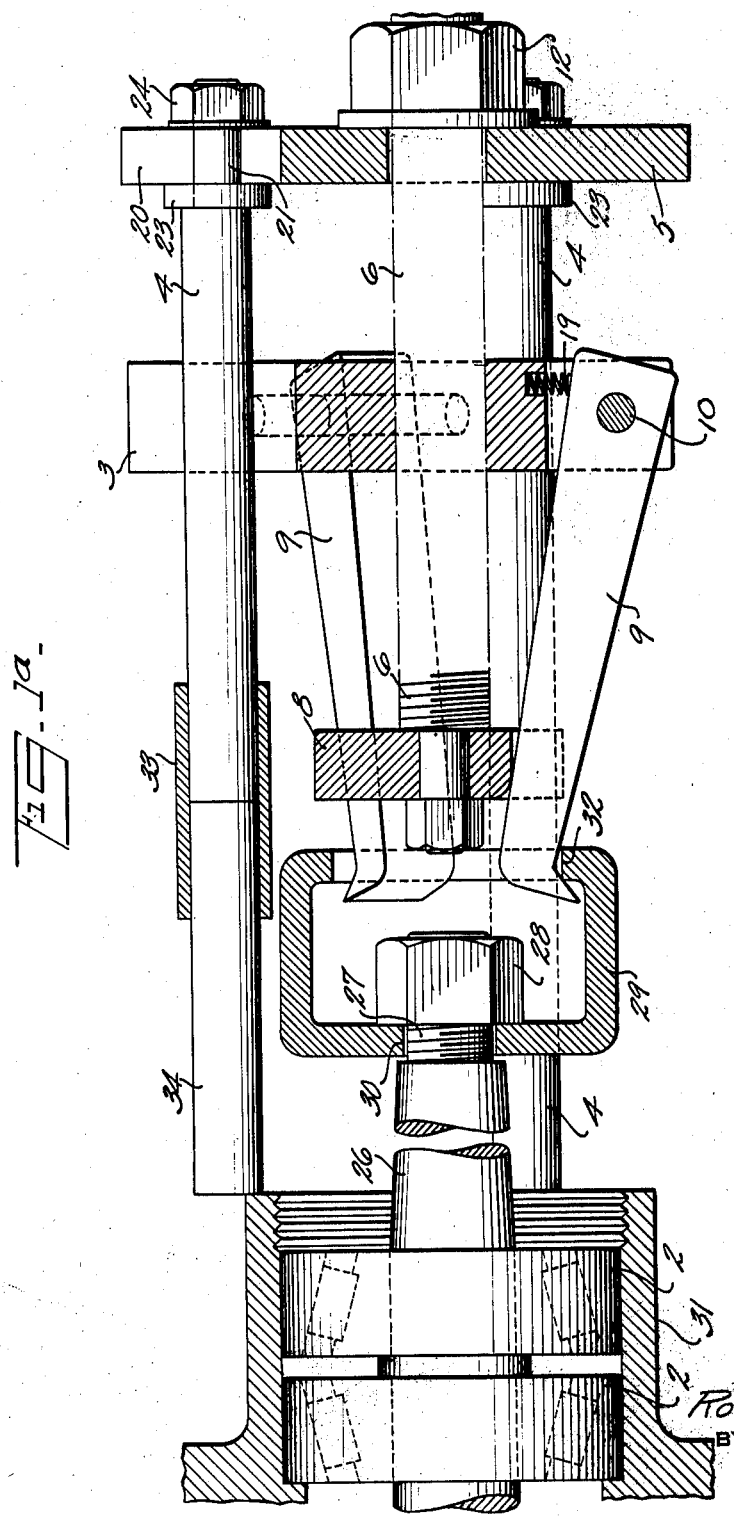

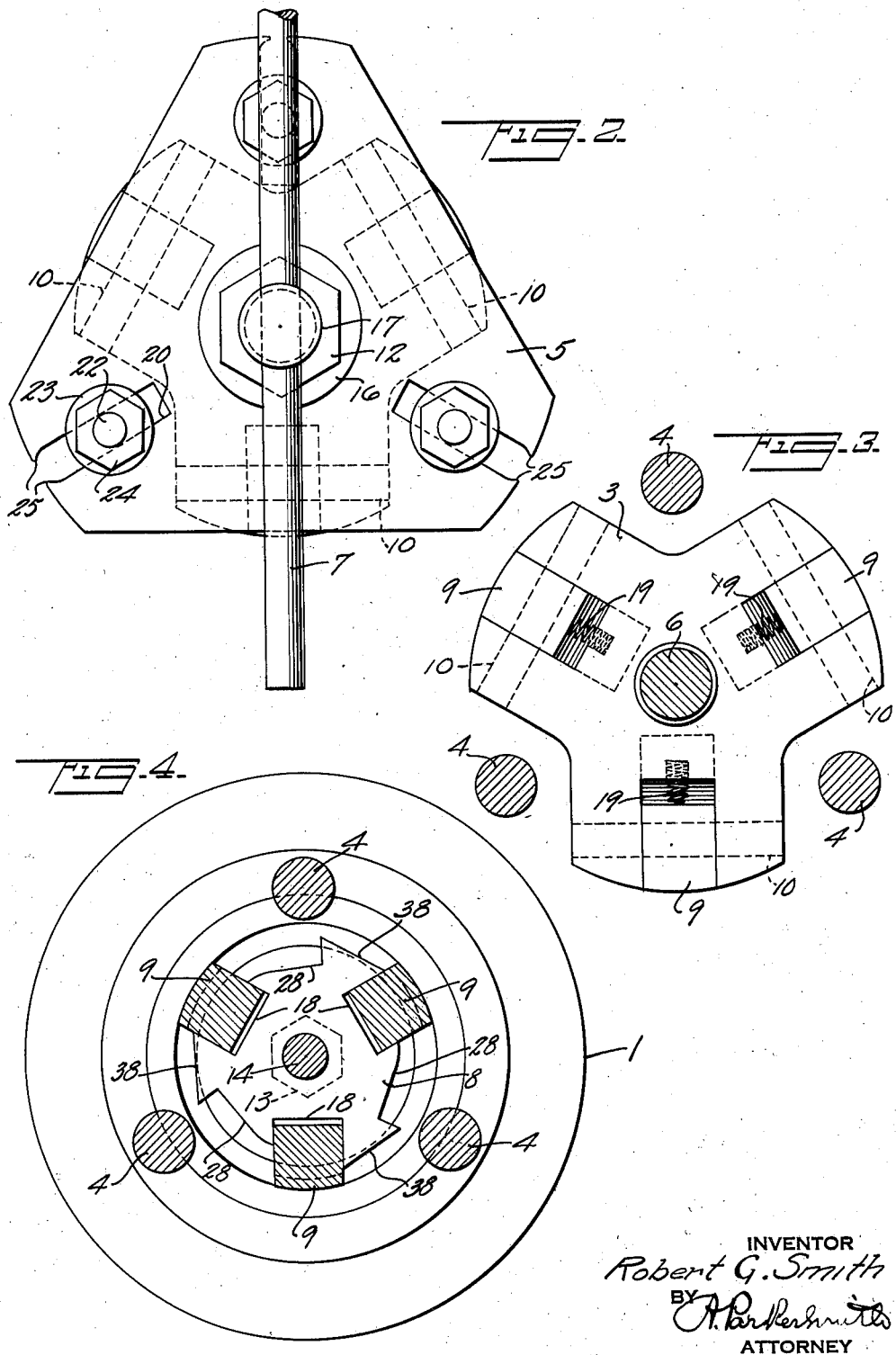

Patented Feb. 12, 1935

1,990,570

UNITED STATES PATENT OFFICE 1,990,570

TOOL FOR REMOVING BEARINGS

Robert G. Smith, West Orange, N. J.

Application December 22, 1932, Serial No. 648,339

6 Claims. (Cl. 29—88.2)

This invention relates generally to tools for quickly extracting any annular object from a setting in which it has been tightly imbedded, but it is more particularly designed to do the work of pulling roller bearing races, now extensively used in building motor cars, from the hub caps or other housings into which they were originally forced under great pressure. After these roller bearings have worn to a certain extent it is desirable to replace them with new ones and the job of pulling out the old bearing races to make way for the new ones is most difficult, unless a special tool has been provided for it.

The object of this invention, therefore, is to produce a tool for that purpose which can be easily and efficiently operated, and will be readily adjustable to fit bearing races and bushings of widely different diameters. Such tools comprise essentially, a pressure member, which bears on the bearing housing when in use, and a pulling member mounted on said pressure member and adapted to grip the inner surface of the race and then be drawn out toward the pressure member, bringing the race with it. To make such tool conveniently usable on bearings of different sizes both the above defined basic elements thereof must be adjustable radially of the common axis of the tool and bearing race, and the present invention has that capacity.

The best form of apparatus at present known to me embodying my invention is illustrated in the accompanying three sheets of drawings, in which:

Fig. 1 is a central vertical section of the tool with the roller bearing race and housing therefor on which it is operating.

Fig. 1a is a similar view of a modification.

Fig. 2 is a plan view with parts broken away.

Fig. 3 is a horizontal section on line 3—3 of Fig. 1, looking downward; and

Fig. 4 is a similar section on line 4—4 of Fig. 1.

Throughout the drawings like characters indicate like parts.

Referring to Figs. 1 to 4, showing the simpler form of tool, 1 indicates a housing or cap into which has been forced a bearing race 2, and the tool is shown in Fig. 1 ready to be forced into engagement with said race and then extract the same from its housing.

3 is a body or main housing plate which as shown in Fig. 3 is of star shape form and is screw threaded on the expanding and pulling screw 6, which forms the axis of the tool.

5 is a pressure plate best shown in Fig. 2 which is centrally mounted on screw shaft 6 but slides freely on the same. 4, 4, are pressure pins set in said pressure plate and extending at right angles therefrom so as to engage the annular surface of the bearing housing 1.

Preferably these pressure pins 4 are adjustable radially of plate 5 by reason of the fact that they are clamped in radial slots 20 in the outer edge portions of said plate, by means of the nuts 24 and washers 23, 23, mounted on the reduced end sections 21 of said pins 4. Preferably the outer ends of the side walls of the slots 20 are peened inwardly slightly as indicated at 25 in Fig. 2 to prevent said pins working out of the slots sideways.

9, 9 are race pulling fingers pivoted at 10 to the body plate 3 and having considerable freedom of swinging motion thereon. 19, 19 are springs normally tending to swing the lower end of fingers 9 inwardly toward screw shaft 6. The outer lower ends of fingers 9 are tapered down to a thin edge as indicated at 11, 11 so they can be forced in beneath the bearing race 2. These finger tips have relatively acute, V-shaped cross sections with their outer surfaces, which are more remote from their pivots 10, 10, backed off from their tip edges or lips sufficiently to always slope inwardly from said edges toward said pivots when in use. As a result, their sharp-edged finger tips can be inserted easily and for a considerable distance into even the very narrow annular space usually existing between the inner edge of the bearing bushing 2 and the bottom surface of the recess in the housing 1 in which such bushing is set, and this without the outer faces of such finger tip touching the bottom of such recess, all as shown in Fig. 1.

The preferred means for forcing these fingers outwardly into such position is the wedging action of the expanding cam 8 carried by the screw threaded shaft 6 and located near the lower ends of said fingers. This cam is mounted on the reduced lower end section 14 of said shaft 6 and retained in position by the nut 13 which screws on the threaded shaft end 15, the shoulder 14 being of such length that when the nut 13 is screwed down against it the cam 8 will still be left free to revolve. Preferably this cam is given a plurality of sets of faces of different radial distances from the axis of the cam, each set having a radial distance from the axis of the cam differing from that of the other sets. Thus, as shown in Fig. 4, there are three depressed faces 18, three less depressed faces 28 and another set 38 of faces having a maximum distance radially from the axis of the reduced end 14 of the shaft on which they are mounted. Any number of such depressed faces other than the three here shown could, of course, be used.

When the cam 8 is so adjusted with the particular set of desired faces registered with the back surfaces of the fingers 9 and the screw shaft 6 is rotated in the body plate 3 by means of the screw handle or capstan bar 7 inserted into capstan head 17 of such shaft, the cam 8 can be forced out between the fingers 9 with the wedging action forcing the finger tips 11 under the inner edge of the race 2 as indicated in Fig. 1. On the other hand, when the shaft 6 is rotated in the opposite direction cam 8 will be pulled toward body plate 3 and the springs 19 will automatically pull the free ends of fingers 9 together until, if required, they are in contact each with the others. This permits the tool to be used effectively on bearing bushings of the smallest diameter within its range of operation, and without requiring any portion of the cam 8 to then project beyond the bushing into the housing recess, as would be the case when the opposite mode of cam operation is employed in many tools of this type heretofore patented. Obviously such opposite mode of cam operation might interfere with the retracted fingers getting under the edge of a small bushing, as the cam would then project far enough to strike the bottom of a shallow bushing recess before the fingers were brought closely enough together to pass through such a bushing.

12 is a puller nut mounted on shaft 6 above pressure plate 5 and bearing on washer 16 located between it and said plate. If, after the fingers have been set in engagement as above described, the nut 12 is screwed down on shaft 6 by turning it with a monkey wrench or other tool; the pressure pins 4 will be firmly seated on housing 1 and then further rotation of the nut will pull out shaft 6 and the whole assembly of puller fingers, bringing with it the race bearing grasped by the tool.

I am aware that it has heretofore been proposed to use tools of this general type in which outwardly swinging fingers have been mounted on an expanding and pulling assembly which in turn has been mounted on a pressure frame bearing on the bearing housing, but so far as I am aware none of said prior tools has been adjustable to housings and bearings of different diameters, which is one of the most important advantages of my above described invention. Also the action of the springs 19 in holding the fingers 9 inclined inwardly so as to cooperate with the central wedging member 8 at all times is particularly advantageous as compared with prior constructions in which said fingers swung freely to and fro and had to be held in position by the operator while adjusting the tool.

Various changes in details of construction above described and here illustrated could be made without departing from the principle of the invention so long as the mode of operation thereof is retained.

Thus in Fig. 1a I have shown how the tool previously described may be modified so as to enable it to pull an axle shaft 26 out of its housing 31. The shaft is held in roller bearings, the races for which are shown at 2, 2, as before. To enable the fingers 9, 9, to pull the shaft I provide a coupling member 29, in the shape of a cup with the inwardly turned lip 32 and a hole 30 in its bottom portion through which latter the threaded end 27 of the shaft may project into the cup interior, where the nut 28 may be screwed on it. The fingers 9, 9, are wedged apart to grasp the lip 32 in the same way as that by which they were made to grasp the bearing race 2, in Fig. 1. Longer pressure pins 4, 4, may be substituted to reach out to a bearing on the axle housing, as indicated at the right hand side of Fig. 1a, or the shorter pins may be pieced out to the necessary length by extension sections, such as 34, attached to the main pin 4 by muff coupling 33, as shown at the left hand side of said Fig. 1a.

In operating the modification expanding cam 8 is screwed out between the fingers, as before, until the finger tips 11, 11, are forced under the flange 32 of the coupling member. Then they are pulled away from the axle housing 31 by screwing down nut 12 on pressure plate 5, which is spaced away by pressure pins 4, 34, from said axle housing. As a result the axle, and the outer half of the roller bearing and the inner race of the inner half, are pulled out together. The fingers are then freed from coupling member 29, the shorter pressure pins 4, 4, alone are installed in pressure plate 5, and the bushing of inner race bearing 2, is pulled out, as in Fig. 1, if a new one is to be substituted.

Having described my invention, I claim:

1. In a tool for pulling bearing races and bushings, a body plate, a set of fingers pivoted to said plate, the free end of each of which is provided with an outwardly projecting lip of relatively acute V-shaped cross section with its face which is more remote from its pivoted support sloping inwardly toward the latter so as to easily be inserted into any narrow annular space existing between the inner end of such bushing and the bottom of the housing recess in which it is located, and yielding means normally forcing said finger ends toward one another, combined with a cam member supported centrally of said set of pivoted fingers, means for forcing said cam member away from said body plate to spread said finger ends apart so as to grasp the under edge of such bearing race, a pressure plate, pressure pins for holding said plate at a fixed distance from such housing, and means independent of said cam adjusting means for pulling said body plate and fingers toward said pressure plate; whereby said finger ends, while held close together by said yielding means, may be inserted through such bushing without said cam member projecting beyond the lower edge thereof, then spread outwardly to engage such bushing edge by forcing said cam member away from said body plate, and finally withdrawn from such housing while positively held in engagement with such bushing.

2. An apparatus such as defined in claim 1 combined with means for adjusting said pressure pins radially of said pressure plate and clamping them in different positions of such radial adjustment; whereby said pressure pins may be arranged to engage bearing housings having recesses of different diameters.

3. In a tool of the character described the combination of a body plate a set of fingers pivoted to said plate so as to swing away from one another and so cause their free ends to engage the inner surface of a bearing race or bushing, and having such free ends shaped for such engagement, an expanding cam movable axially toward and from said body plate along a line centrally located with reference to said fingers and means for so moving said cam comprising a support on which it may rotate, said cam having a plurality of faces adapted to cooperate in wedging action with the adjacent surfaces of said fingers and located at different radial distances from the axis of said cam; whereby, after said cam has been so adjusted by rotation on said axis that one or another of its said sets of faces bear on said fingers, the expanding wedgelike action thereof will be limited to a zone of predetermined maximum and minimum diameter so that said fingers may then be forced into engagement with bearing races or bushings having internal diameter within the limits of such zones.

4. A combination such as defined in claim 3 in which there are three such pivoted fingers and three sets of such cam faces; so that three such zones of finger adjustment are created.

5. In a tool of the character described having a set of radially movable fingers, a body member to which they are pivoted, pressure members disposed around said fingers and adapted to rest on an annular housing, and means supported from said pressure pins for pulling said fingers away from such housing, the combination, with said above described apparatus, of a coupling member in the form of a cylindrical cup of relatively considerable internal diameter having an opening of relatively small diameter centrally disposed in its bottom through which any screw threaded extension on the end of a shaft may be inserted and clamped by a nut screwed thereon, and also having at its other, open end, a narrow, inwardly extending annular lip adapted to be grasped by the radially expanded fingers of an apparatus of the first above described character; whereby, when said coupling member is fastened to such shaft end, said fingers have been swung outward to engage said lip, said pressure pins arranged to bear on such housing, and said pulling means put in operation, such shaft will be pulled from its housing.

6. In a tool of the character described, the combination of a set of radially movable fingers, a body member to which they are pivoted, pressure members composed of detachable sections disposed around said fingers and adapted to rest on an annular housing, means supported by said pressure members for pulling the fingers away from said housing, and a coupling member adapted to be fastened on the end of a shaft projecting from said housing and provided with an opening of considerable diameter spaced away from the end to which said shaft is to be attached, said opening being surrounded by an inwardly projecting lip adapted to be grasped by said fingers when the latter are inserted in said opening and forced outwardly against said lip, whereby, when said coupling member is fastened to such shaft end, said fingers have been swung outward to engage said lip, said pressure members arranged to bear on said housing and said pulling means put in operation, such shaft will be pulled from its housing and, on the shortening of said pressure members by removal of certain of their constituent sections, the same tool may be adapted to varying classes of work.

ROBERT G. SMITH.